United States Patent
Li et al.

(10) Patent No.: US 11,917,678 B2
(45) Date of Patent: Feb. 27, 2024

(54) SYSTEMS AND METHODS FOR FACILITATING SIMULTANEOUS POLL RESPONSES

(71) Applicant: Intel Corporation, Santa Clara, CA (US)

(72) Inventors: Qinghua Li, San Ramon, CA (US); Po-Kai Huang, San Jose, CA (US); Hujun Yin, Saratoga, CA (US); Xiaogang Chen, Portland, OR (US); Yuan Zhu, Beijing (CN); Xintian Lin, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/034,028

(22) Filed: Jul. 12, 2018

(65) Prior Publication Data

US 2019/0045539 A1 Feb. 7, 2019

Related U.S. Application Data (63) Continuation of application No. 14/566,053, filed on Dec. 10, 2014, now abandoned.

(Continued)

(51) Int. Cl.
*H04W 74/06* (2009.01)
*H04L 1/00* (2006.01)
(Continued)

(52) U.S. Cl.
CPC ........... *H04W 74/06* (2013.01); *H04L 1/0026* (2013.01); *H04L 5/006* (2013.01); *H04L 5/0037* (2013.01);
(Continued)

(58) Field of Classification Search
CPC ............. H04W 74/06; H04W 72/0453; H04W 72/1226; H04W 88/02; H04L 5/0037; H04L 5/006; H04L 1/0026; H04L 27/2601
See application file for complete search history.

(56) References Cited

U.S. PATENT DOCUMENTS

| 6,404,756 B1 * | 6/2002 | Whitehill ................ H04L 43/00 370/338 |
| 2002/0136183 A1 * | 9/2002 | Chen ..................... H04W 16/14 370/338 |

(Continued)

FOREIGN PATENT DOCUMENTS

CN 102892103 A 1/2013

OTHER PUBLICATIONS

T. Kim, S. Choudhury, Z. Jin, K. Doppler and C. Ghosh, "Simultaneous polling mechanism for low power sensor networks using ZC sequences," 2012 IEEE 23rd International Symposium on Personal, Indoor and Mobile Radio Communications—(PIMRC), Sydney, NSW, 2012, pp. 2024-2029, d (Year: 2012).*

(Continued)

*Primary Examiner* — Thinh D Tran
(74) *Attorney, Agent, or Firm* — Eversheds Sutherland (US) LLP (57) ABSTRACT

The present disclosure relates to computer-implemented systems and methods for facilitating simultaneous poll responses. A method may include assigning respective subsets of subcarrier frequencies to a plurality of user devices for communication over a wireless channel. The method may also include transmitting, simultaneously, a channel status request poll to the user devices. Additionally, the method may include determining, based at least in part on a first channel status response received via a first subset of subcarrier frequencies over the wireless channel, that the (Continued)

first channel status response is received from the first user device. Similarly, the method may also include determining a second channel status response is received from a second user device. Furthermore, the method may include determining, based at least in part on the first channel status response and the second channel status response, to schedule simultaneous data communication for the first device and the second device.

20 Claims, 4 Drawing Sheets

Related U.S. Application Data (60) Provisional application No. 62/009,473, filed on Jun. 9, 2014.

(51) Int. Cl.
*H04L 5/00* (2006.01)
*H04L 27/26* (2006.01)
*H04W 72/0453* (2023.01)
*H04W 72/54* (2023.01)
*H04W 88/02* (2009.01)

(52) U.S. Cl.
CPC ..... *H04L 27/2601* (2013.01); *H04W 72/0453* (2013.01); *H04W 72/54* (2023.01); *H04W 88/02* (2013.01)

(56) References Cited

U.S. PATENT DOCUMENTS

| | | | | |
|---|---|---|---|---|
| 2002/0191573 A1* | 12/2002 | Whitehill | ................ | H04L 1/208 370/338 |
| 2004/0257996 A1* | 12/2004 | Choi | ..................... | H04W 74/06 370/235 |
| 2005/0141495 A1* | 6/2005 | Lin | ..................... | H04W 28/065 370/389 |
| 2008/0232490 A1* | 9/2008 | Gross | .................... | H04L 5/0037 375/260 |
| 2011/0150004 A1* | 6/2011 | Denteneer | ............. | H04L 5/0023 370/476 |
| 2011/0158159 A1* | 6/2011 | Gong | .................... | H04W 72/21 370/328 |
| 2011/0305156 A1* | 12/2011 | Liu | ..................... | H04L 43/0888 370/252 |
| 2012/0063406 A1 | 3/2012 | Seok | | |
| 2012/0082045 A1 | 4/2012 | Liu et al. | | |
| 2013/0223419 A1* | 8/2013 | Ghosh | ............... | H04W 52/0235 370/338 |
| 2013/0301605 A1* | 11/2013 | Kim | ..................... | H04W 72/042 370/330 |
| 2015/0036572 A1* | 2/2015 | Seok | ..................... | H04W 74/06 370/311 |
| 2016/0066349 A1* | 3/2016 | Seok | ................. | H04W 74/0808 370/338 |
| 2016/0081010 A1* | 3/2016 | Seok | ................. | H04W 72/0453 370/329 |

OTHER PUBLICATIONS

Office Action for Chinese Application No. 201580024327.5, dated Sep. 12, 2019, 23 pages (15 pages English, 8 pages Chinese).
Office Action for Indian Application No. 201647036721, dated Dec. 18, 2019, 7 pages.
Office Action and Search Report for Chinese Application No. 201811466274.4, dated Apr. 13, 2021, 21 pages (10 pages of english translation).

\* cited by examiner

SYSTEMS AND METHODS FOR FACILITATING SIMULTANEOUS POLL RESPONSES

CROSS-REFERENCE TO RELATED APPLICATION

This application is a continuation of U.S. Non-Provisional application Ser. No. 14/566,053, filed Dec. 10, 2014, which claims the benefit of U.S. Provisional Application No. 62/009,473, filed Jun. 9, 2014, the disclosures of which are incorporated herein by reference in their entireties.

TECHNICAL FIELD

The present disclosure generally relates to wireless communication, and in particular, facilitating simultaneous poll responses.

BACKGROUND

User devices currently perform location determination with respect to a wide range of applications and uses. For instance, mapping, navigation, social networking, shopping, and/or the like may all benefit from, and request the use of, location determination. To this end, a user device may use various types of components and signals to perform location determination, such as Wi-Fi signals, cellular signals, satellite signals, and/or the like. However, use of these signals and their corresponding electronic components may increase power consumption of the user device.

BRIEF DESCRIPTION OF THE DRAWINGS

Reference will now be made to the accompanying figures and diagrams, which are not necessarily drawn to scale, and wherein.

DETAILED DESCRIPTION

In the following description, numerous specific details are set forth. However, it should be understood that embodiments of the present disclosure may be practiced without these specific details. In other instances, well-known methods, structures, and techniques have not been shown in detail in order not to obscure an understanding of this description. References to "one embodiment," "an embodiment," "example embodiment," "various embodiments," and so forth indicate that the embodiment(s) of the present disclosure so described may include a particular feature, structure, or characteristic, but not every embodiment necessarily includes the particular feature, structure, or characteristic. Furthermore, repeated use of the phrase "in one embodiment" does not necessarily refer to the same embodiment, although it may.

As used herein, unless otherwise specified, the use of the ordinal adjectives "first," "second," "third," etc., to describe a common object merely indicates that different instances of like objects are being referred to and are not intended to imply that the objects so described must be in a given sequence, either temporally, spatially, in ranking, or in any other manner.

As used herein, unless otherwise specified, the term "mobile device" and/or "device" refers, in general, to a wireless communication device, and more particularly to one or more of the following: a portable electronic device, a telephone (e.g., cellular phone, smart phone), a computer (e.g., laptop computer, tablet computer), a portable media player, a personal digital assistant (PDA), or any other electronic device having a networked capability.

As used herein, unless otherwise specified, the term "server" may refer to any computing device having a networked connectivity and configured to provide one or more dedicated services to clients, such as a mobile device. The services may include storage of data or any kind of data processing. One example of the server may include a web server hosting one or more web pages. Some examples of web pages may include social networking web pages. Another example of a server may be a cloud server that hosts web services for one or more computer devices.

As used herein, unless otherwise specified, the term "receiver" may refer to any device or component capable of receiving data, signals, information, etc. For example, a receiver may include an antenna or any other receiving device.

As used herein, unless otherwise specified, the term "transmitter" may refer to any device or component capable of transmitting data, signals, information, etc. For example, a transmitter may also include an antenna or any other transmission device.

As used herein, unless otherwise specified, the term "transceiver" may refer to any device or component capable of performing the functions of a receiver and/or a transmitter. For example, transceivers may include, but are not limited, antennas, amplifiers, filters, modulation and/or demodulation components, analog-to-digital converters, digital-to-analog converters, and/or the like.

According to certain embodiments, the functionality provided by the receiver and the transmitter may be included in a single transceiver device.

The present disclosure relates to computer-implemented systems and methods for efficient communication station status polling. According to one or more embodiments of the disclosure, a device for wireless communication is provided. The device may include at least one antenna, a radio transceiver and at least one memory for storing data and computer-executable instructions. Additionally, the device may also include at least one processor to access the at least one memory and to execute the computer-executable instructions. Furthermore, the at least one processor may be configured to execute the instructions to assign respective subsets of subcarrier frequencies to a plurality of user devices for communication with the plurality of user devices over a wireless channel. As such, a first user device of the plurality of devices may be associated with a first subset of subcarrier frequencies, and a second user device of the plurality of devices may be associated with a second subset of subcarrier frequencies. Additionally, the at least one processor may be configured to execute the instructions to transmit, simultaneously via the radio transceiver and the at least one antenna, a channel status request poll to the plurality of user devices. The at least one processor may also be configured to execute the instructions to determine, based at least in part on a first channel status response received via the first subset of subcarrier frequencies over the wireless channel, that the first channel status response is received from the first user device. The at least one processor may also be configured to execute the instructions to determine, based at least on part on a second channel status response received via the second subset of subcarrier frequencies over the wireless channel, that the second channel status response is received from the second user device. Furthermore, the at least one processor may also be configured to execute the instructions to determine, based at least in part on the first channel status response and the second channel status response, to schedule simultaneous data communication for the first device and the second device According to one or more embodiments of the disclosure, a method is provided. The method may include assigning, by a device comprising one or more processors, respective subsets of subcarrier frequencies to a plurality of user devices for communication over a wireless channel. As such, a first user device of the plurality of devices may be associated with a first subset of subcarrier frequencies, and a second user device of the plurality of devices may be associated with a second subset of subcarrier frequencies. The method may also include transmitting, simultaneously via a radio transceiver and at least one antenna included in the computer, a channel status request poll to the plurality of user devices. Additionally, the method may include determining, based at least in part on a first channel status response received via the first subset of subcarrier frequencies over the wireless channel, that the first channel status response is received from the first user device. The method may also include determining, based at least on part on a second channel status response received via the second subset of subcarrier frequencies over the wireless channel, that the second channel status response is received from the second user device. Furthermore, the method may include determining, based at least in part on the first channel status response and the second channel status response, to schedule simultaneous data communication for the first device and the second device.

According to one or more embodiments of the disclosure, a non-transitory computer-readable medium is provided. The non-transitory computer-readable medium may have embodied thereon instructions executable by one or more processors. The instructions may cause the one or more processors to assign respective subsets of subcarrier frequencies to a plurality of user devices for communication with the plurality of user devices over a wireless channel. As such, a first user device of the plurality of devices may be associated with a first subset of subcarrier frequencies, and a second user device of the plurality of devices may be associated with a second subset of subcarrier frequencies. Additionally, the computer-readable medium may include instructions to transmit, simultaneously, a channel status request poll to the plurality of user devices. Moreover, the computer-readable medium may include instructions to determine, based at least in part on a first channel status response received via the first subset of subcarrier frequencies over the wireless channel, that the first channel status response is received from the first user device. The computer-readable medium may also include instructions to determine, based at least on part on a second channel status response received via the second subset of subcarrier frequencies over the wireless channel, that the second channel status response is received from the second user device. Furthermore, the computer-readable medium may also include instructions to determine, based at least in part on the first channel status response and the second channel status response, to schedule simultaneous data communication for the first device and the second device.

Figure 1:
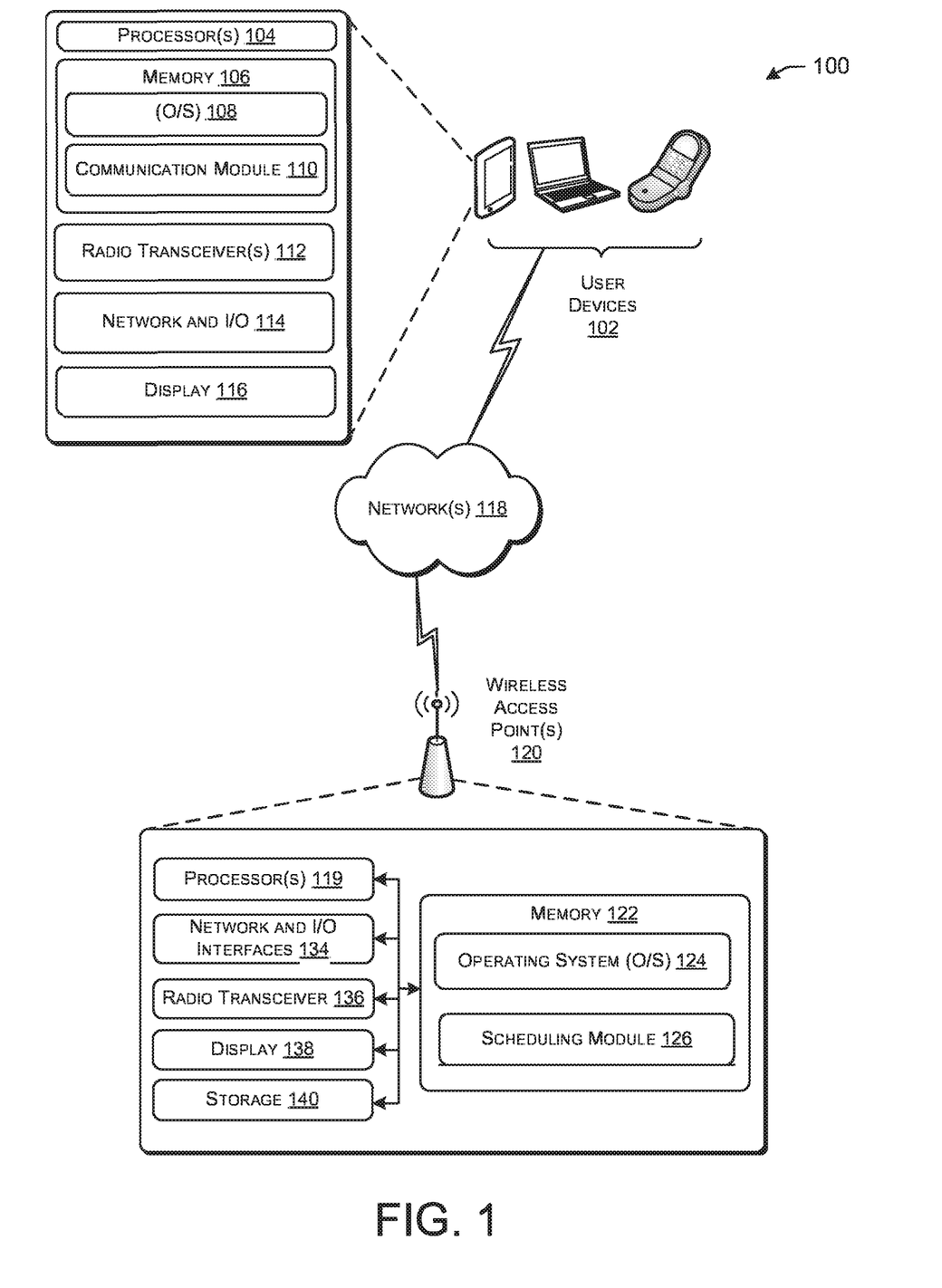
FIG. 1 shows a block diagram of a system for facilitating simultaneous poll responses, according to one or more example embodiments.

The above principles, as well as perhaps others, are now illustrated with reference to FIG. 1, which depicts a system 100 for managing short-range communication. The system 100 may include a user device 102 having one or more computer processors 104 and a memory 106, which may store an operating system 108 and a communication module 110. The user device 102 may further include a radio transceiver 112, network and input/output (I/O) interfaces 114, and a display 116 in communication with each other. The system 100 may also include a network 118 to facilitate communication between the user device 102 and one or more access points 120. The user device 102 may also be refer to a communication station or station.

The wireless access point 120 may include one or more computer processors 119, and a memory 122, which may include an operating system 124 and a scheduling module 126. The wireless access point 120 may further include network and input/output (I/O) interfaces 134, a radio transceiver 136, a display 138, and a storage 140 in communication with each other. It will be appreciated that all radio transceivers 112/136 described with respect to the user device 102 and access point(s) 120 may be configured to receive and/or transmit any type of radio signals (e.g., Dedicated short-range communication (DSRC) signals, WiFi radio signals, Bluetooth radio signals, Bluetooth Low-Energy radio signals, etc.). In certain implementations, the wireless access point 120 may also be referred to as a base station or beacon. Furthermore, it will be appreciated that the wireless access point 120 may also include other types of communication devices performing operations described herein with respect to the wireless access point 120. For example, in a peer-to-peer communication between two devices, one device may be a master device while the other device may be a client device. The master device may be configured to perform one or more of the operations described herein with respect to the access point 120. Thus, in certain implementations, the access point 120 may also be referred to as a master device.

The computer processors 104/119 may comprise one or more cores and may be configured to access and execute (at least in part) computer-readable instructions stored in the memory 106/122. The one or more computer processors 104/119 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user devices 102 may also include a chipset (not shown) for controlling communications between the one or more processors 104/119 and one or more of the other components of the user device 102. In certain embodiments, the user device 102 may be based on an Intel® architecture or an ARM® architecture, and the processor(s) and chipset may be from a family of Intel® processors and chipsets. The one or more processors 104 may also include one or more application-specific integrated circuits (ASICs) or application-specific standard products (ASSPs) for handling specific data processing functions or tasks.

The memory 106/122 may comprise one or more computer-readable storage media (CRSM). In some embodiments, the memory 106/122 may include non-transitory media such as random access memory (RAM), flash RAM, magnetic media, optical media, solid-state media, and so forth. The memory 106 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 106/122 may store an operating system that includes a plurality of computer-executable instructions that may be implemented by the computer processor 104/119 to perform a variety of tasks to operate the interface(s) and any other hardware installed on the user device 102. The memory 106/122 may also store content that may be displayed by the user device 102 or transferred to other devices (e.g., headphones) to be displayed or played by the other devices. The memory 106/122 may also store content received from the other devices. The content from the other devices may be displayed, played, or used by the user device 102 to perform any necessary tasks or operations that may be implemented by the computer processor 104/119 or other components in the user device 102 and/or wireless access point 120.

The network and I/O interfaces 114/134 may comprise one or more communication interfaces or network interface devices to provide for the transfer of data between the user device 102 and another device (e.g., network server) via a network (not shown). The communication interfaces may include, but are not limited to: body area networks (BANs), personal area networks (PANs), wired local area networks (LANs), wireless local area networks (WLANs), wireless wide area networks (WWANs), and so forth. The user device 102 may be coupled to the network via a wired connection. However, the wireless system interfaces may include the hardware and software to broadcast and receive messages either using the Wi-Fi Direct Standard and/or the IEEE 802.11 wireless standard, the Bluetooth standard, the Bluetooth Low-Energy standard, the Wi-Gig standard, and/or any other wireless standard and/or a combination thereof. The wireless system may include a transmitter and a receiver or a transceiver capable of operating in a broad range of operating frequencies governed by the IEEE 802.11 wireless standards. The communication interfaces may utilize acoustic, radio frequency, optical, or other signals to exchange data between the user device 102 and another device such as an access point, a host computer, a server, a router, a reader device, and the like. The network 118 may include, but is not limited to: the Internet, a private network, a virtual private network, a wireless wide area network, a local area network, a metropolitan area network, a telephone network, and so forth.

The display 116/138 may include, but is not limited to, a liquid crystal display, a light-emitting diode display, or an E-Ink™ display as made by E Ink Corp. of Cambridge, Massachusetts. The display may be used to show content to a user in the form of text, images, or video. In certain instances, the display may also operate as a touch screen display that may enable the user to initiate commands or operations by touching the screen using certain finger or hand gestures.

It will be appreciated that in certain implementations, the wireless access point 120 may not necessarily store a full O/S in memory 122. For example, the processor(s) 119 may be an ASIC designed specifically to perform the operations of the scheduling module 126, as described below. As such, the ASIC may be configured to process computer-executable instructions stored in the memory 122, such as those associated with firmware and/or other types of instructions.

According to one or more embodiments, the scheduling module 126 may be configured to determine perceived channel status information associated with a wireless channel. The perceived channel status information may include data indicating whether the wireless channel is busy or clear (e.g., idle) from the perspective of the wireless access point 120. It will be appreciated that the perceived channel status information may also include data indicating a variety of other aspects associated with a condition and/or status of the wireless channel including, but not limited to, channel bandwidth, channel frequency, subcarrier frequencies, channel noise, signal strength, and/or the like. Based on the perceived channel status information, the scheduling module 126 may determine that the wireless channel is clear.

In addition to determining that the wireless channel is clear, the scheduling module 126 may be configured to facilitate simultaneous data communication among a plurality of user devices 102. As such, by facilitating the simultaneous data communication (e.g., combining multiple data transmission from multiple user devices 102 into a single data burst), the scheduling module 126 may increase efficiency of data communication among the plurality of user devices 102 as a whole. For example, simultaneous data communication may reduce an amount of time with respect to performing the data communication among the plurality of user devices 102 compared to scheduling such communication at different times.

In order to schedule simultaneous data communication among the plurality of devices 102, the scheduling module 126 may assign different subcarrier frequencies to the plurality of user devices. For instance, a wireless a channel may be associated with a plurality of subcarrier frequencies. The scheduling module 126 may assign respective subsets of the subcarrier frequencies to respective user devices of the plurality of user devices 102. For instance, the scheduling module 126 may assign a first user device (e.g., from the plurality of user devices 102) a first subset of subcarrier frequencies of the plurality of subcarrier frequencies. Additionally, the scheduling module 126 may assign a second user device (e.g., from the plurality of user devices 102) a second subset subcarrier frequencies of the plurality of subcarrier frequencies. As such, communication from the first user device to the wireless access point 120 may be transmitted via the first subset of subcarrier frequencies. Similarly, communication from the second user device to the wireless access point 120 may be transmitted via the second subset of subcarrier frequencies.

As a result, the scheduling module 126 may be configured to identify a source associated with a transmitted communication based at least in part on a subset of subcarrier frequencies in which the communication was transmitted. For instance, in view of the subcarrier frequency assignments described in the above example, the scheduling module 126 may determine that a particular communication has been transmitted via the first subset of subcarrier frequencies. Thus, the scheduling module 126 may determine that the particular communication was transmitted by the first user device. Similarly, if the scheduling module 126 determines that the particular communication was transmitted via the second subset of subcarrier frequencies, the scheduling module 126 may determine that the particular communication was transmitted from the second user device.

Upon assignment of the respective subsets of subcarrier frequencies to the plurality of user devices 102, the scheduling module 126 may simultaneously transmit, via the radio transceiver 136, a channel status request poll to the plurality of user devices 102. In response, one or more of the plurality of user devices 102 may transmit respective channel status responses back to the scheduling module 126 and/or wireless access point 120. According to certain implementations, transmission of a respective channel status response by a particular user device 102 may indicate that the user device 102 is ready for data communication. If the particular user device 102 is not ready for data communication, the particular user device 102 may determine not to transmit a response to the channel status request at all. Furthermore, in certain implementations, whether a particular user device 102 may be ready for data communication may depend on various factors.

According to certain implementations, the particular user device 102 may determine, from its perspective, whether the wireless channel is clear. The particular user device 102 may also determine whether it includes data to be transmitted. As such, the particular user device 102 may determine it is ready for data communication if the wireless channel is indeed clear, and there is data to be transmitted. For example, the communication module 110 of a particular user device 102 may be configured to determine, in response to a received channel status request poll, its own perceived channel status information (hereinafter "device channel status information"). As such, the communication module 110 may determine, based on the device channel status information, whether the wireless channel is clear from the perspective of the particular user device 102.

Additionally, the communication module 110 may also determine, in response to the received channel status request poll, whether there is data for the particular user device 102 to transmit. For instance, the particular user device 102 may include a data buffer used for data communication, which may be stored in memory 106. If the communications module 110 determines that the buffer is empty, then the communications module 110 may conclude that there is no data for the particular device 102 to transmit. On the other hand, if the communication module 110 determines that the buffer is not empty (e.g., the buffer is storing data), the communication module 110 may conclude that there is data for the particular device 110 to transmit. In certain implementations, the communication module 110 may instead determine an amount of data stored by the buffer. As such, the communication module 110 may determine whether the amount of data is greater than or equal to a data threshold. If so, the communication module 110 may determine that there is data for the particular user device 102 to send. If not, the communication module 110 may conclude that there is no data for the particular user device 102 to send.

Additionally, as previously discussed, if the communication module 110 determines that both the wireless channel is clear and that there is data for the particular user device 102 to send, the communication module 110 may transmit a respective channel status response to the wireless access point 120 indicating that the particular device 102 is ready for data communication. On the other hand, if the communications module 110 determines that the wireless channel is busy or that there is no data to be sent, the communications module 110 may not transmit a respective channel status response to the wireless access point 120. Alternatively, the communication module 110 may transmit a respective status response indicating that the particular device 102 is not ready for data communication.

Thus, the scheduling module 126 of the wireless access point 120 may receive one or more channel status responses from the plurality of devices 102 in response to the transmitted channel status requests. In certain embodiments, the respective channel status requests may be clear channel assessment (CCA) requests, and the one or more channel status responses may be CCA responses. Furthermore, the one or more channel status responses may indicate whether respective user devices 102 are ready for data communication.

As previously discussed, the respective channel status responses may be received and/or transmitted over respective subcarrier frequencies associated with the wireless channel. Additionally, respective channel status responses may be received and/or transmitted simultaneously. Further still, the respective channel status responses may be received and/or transmitted simultaneously as part of an orthogonal frequency division multiplexing (OFDM) signal or a frequency division multiple access (FDMA) signal. As such, the amount of time taken to communicate the respective channel status responses may be relatively low compared with other techniques.

Furthermore, the scheduling module 126 may determine, based on the respective channel status responses received from the plurality of user devices 102, whether to schedule simultaneous data communication for one or more of the plurality of devices 102. For instance, the scheduling module 126 may determine a number of channel status responses (e.g., from the respective channel status responses) that indicate a confirmed readiness for data communication. As previously discussed, in certain cases, this number may simply be the number of received channel status responses. As such, the scheduling module 126 may determine whether the number of channel status responses indicating a confirmed readiness for data communication is greater than or equal to a number threshold. For instance, the number threshold may be a predetermined number, such as the maximum number of spatial streams and/or user devices 102 for which the scheduling module 126 may schedule simultaneous data communication, another number, and/or any combination thereof. To this end, if the number of channel status responses is greater than or equal to the number threshold, the scheduling module 126 may identify the respective devices that transmitted channel status responses indicating a confirmed readiness for data communication. Furthermore, the scheduling module 126 may schedule simultaneous data communication for the respective identified channel status responses. In certain implementations, if the number of channel status responses is less than the number threshold, the scheduling module 126 may be configured to identify another set of user devices that may be available for simultaneous data transmission.

In certain implementations, the wireless access point 120 may include a signal amplifier (not illustrated) to facilitate signal reception and/or transmission. Furthermore, the one or more channel status responses may include respective wireless signal preambles. To this end, the signal amplifier may adjust, based at least in part on the respective wireless signal preambles, a gain associated with the signal amplifier. Wireless preambles are discussed in more detail with reference to FIG. 4 below.

Figure 2:
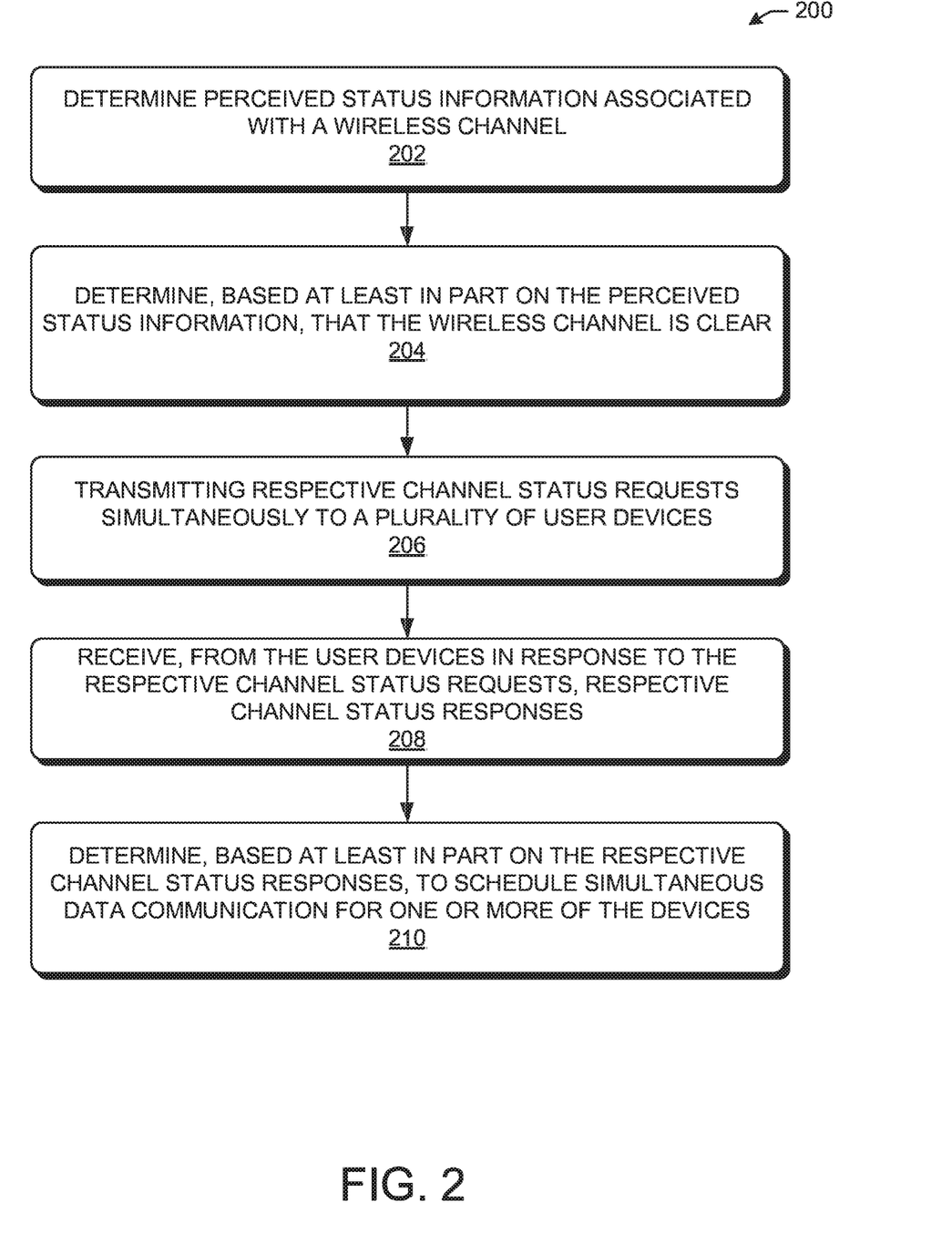
FIG. 2 shows a flow diagram for facilitating simultaneous poll responses, according to one or more example embodiments.

Referring now to FIG. 2, a flow diagram of a method 200 is illustrated depicting efficient communication station status polling in accordance with one or more example embodiments. The method 200 may begin in block 202, where a wireless access point, such as wireless access point 120, may determine perceived status information associated with a wireless channel. In block 204, the wireless access point 120 may determine, based at least in part on the perceived status information, that the wireless channel is clear. In block 206, the wireless access point 120 may transmit respective channel status requests simultaneously to a plurality of user devices. In block 208, the wireless access point 120 may receive, from the plurality of user devices in response to the respective channel status requests, one or more channel status responses. As such, the one or more channel status responses may be received over respective subcarrier frequencies associated with the wireless channel. In block 210, the wireless access point 102 may determine, based at least in part on the one or more channel status responses, to schedule simultaneous data communication for one or more of the plurality of user devices.

Figure 3:
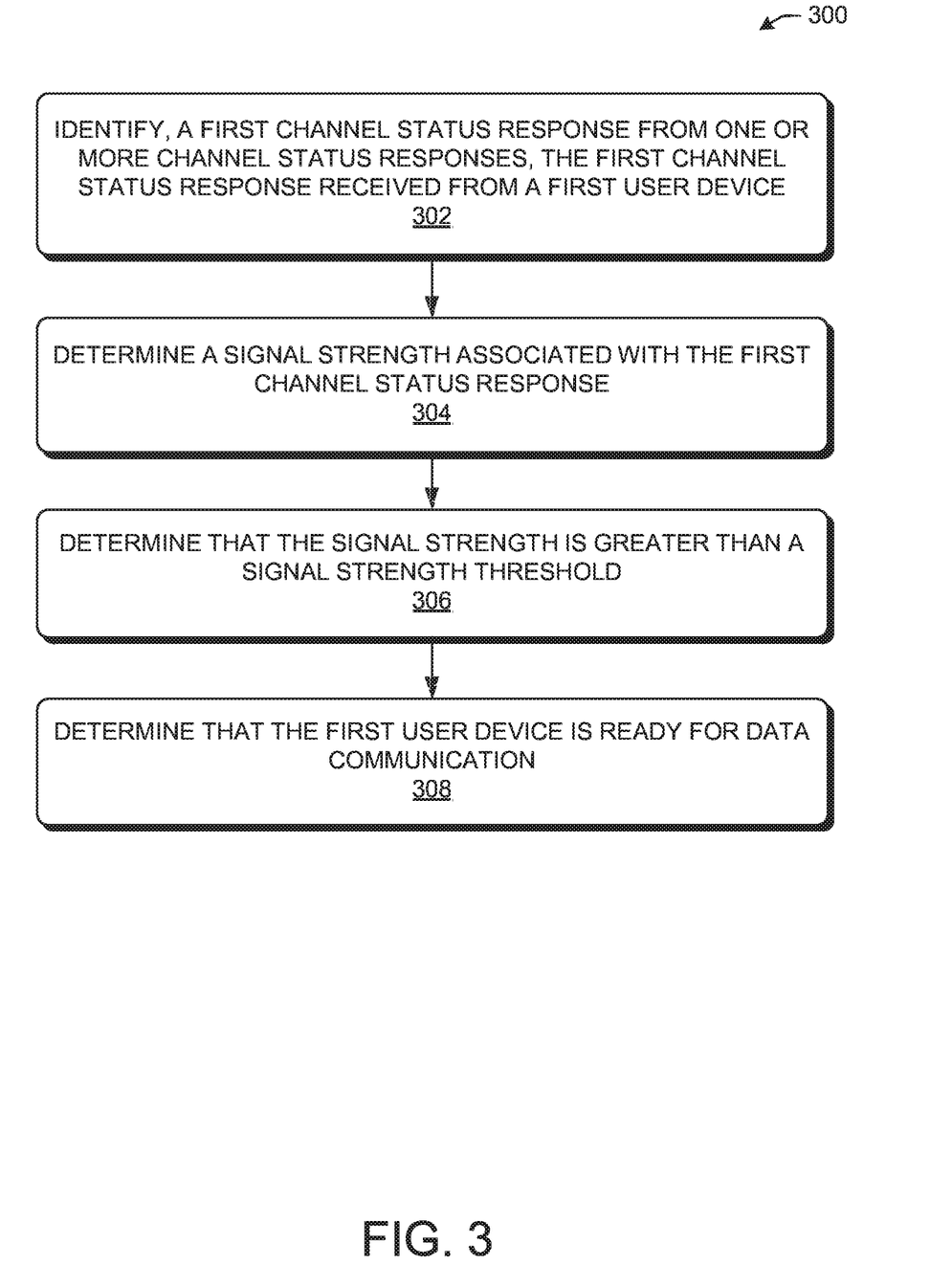
FIG. 3 shows a flow diagram for facilitating simultaneous poll responses, according to one or more example embodiments.

Referring now to FIG. 3, a flow diagram of a method 300 is illustrated for efficient communication station status polling in accordance with one or more example embodiments. In certain implementations, the method 300 may represent an example determination, by an access point (e.g., access point 120), of whether a user device (e.g., user device 102) is ready for data communication. The method 300 may begin in block 302, in which the wireless access point 120 may identify a first channel status response from one or more channel status responses. As such, the first channel status response may be received from a first user device of a plurality of user devices.

In block 304, the wireless access point 120 may determine a signal strength associated with the first channel status response. In block 306, the wireless access point 120 may determine that the signal strength is greater than a signal strength threshold. In block 308, the wireless access point 120 may determine that the first user device is ready for data communication.

Figure 4:
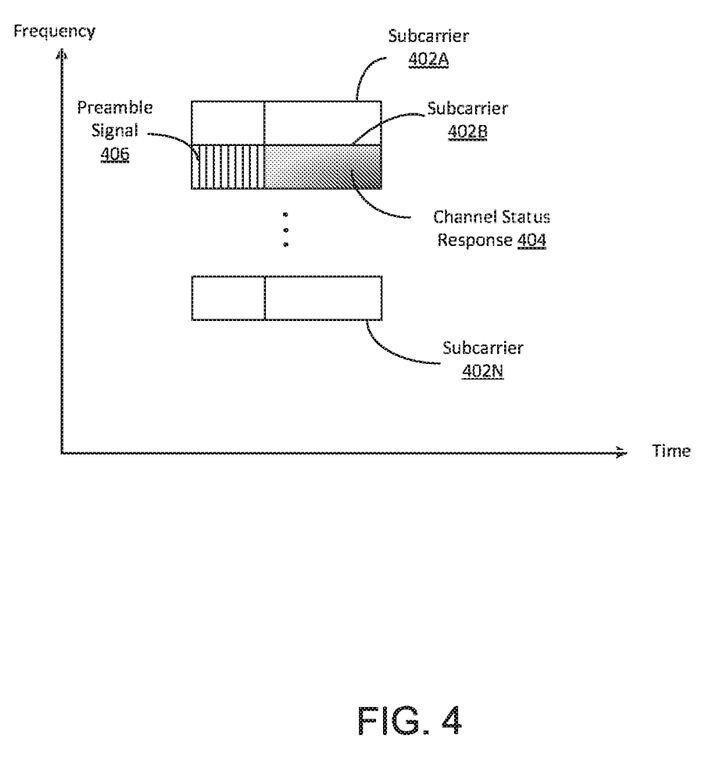
FIG. 4 shows example poll responses according to one or more example embodiments.

Referring now to FIG. 4, a diagram depicting example channel status responses from one or more user devices are illustrated in accordance with one or more example embodiments. The diagram may illustrate data received by a communications device, such as wireless access point 120, over subcarriers 402A-N over a predetermined period of time. In particular, the diagram 400 may illustrate a channel status response transmitted over subcarrier 402B, such as from a user device 102. To this end, the channel status response 404 may be associated with a preamble signal 406, which may be transmitted before the channel status response 404. It will be appreciated that while FIG. 4 illustrates a single channel status response 404 associated with a sign preamble signal 406, multiple channel status responses associated with multiple preamble signals 406 may also be received by the access point 120 from multiple user devices.

In certain embodiments, the preamble signal 406 may be used by the wireless access point 120 to adjust an input gain to a signal identifier included in the access point. For example, the wireless access point 120 may adjust, based on the preamble signal 406, an input gain to the signal amplifier such that the wireless access point 120 can detect the channel status response 404 over subcarrier 402B. According to some implementations, the period or duration of the preamble signal 406 may be relatively short compared to the channel status response 404.

In other implementations, in order to increase robustness of the preamble signal 406, one or more delays may be introduced (e.g., according to a (CDD) framework) in transmitting multiple preamble signals and/or channel status responses from multiple user devices. As such, the preamble signal 406 may include a set of frequency tones having a period and/or duration significantly shorter than that of the channel status response 404 (e.g., shorter by a factor of approximately 4-10 times that of the channel status response 404).

Certain embodiments of the present disclosure are described above with reference to block and flow diagrams of systems and methods and/or computer program products according to example embodiments of the present disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the present disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the present disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the present disclosure have been described in connection with what is presently considered to be the most practical and various embodiments, it is to be understood that the present disclosure is not to be limited to the disclosed embodiments, but is intended to cover various modifications and equivalent arrangements included within the scope of the appended claims. Although specific terms are employed herein, they are used in a generic and descriptive sense only and not for purposes of limitation.

This written description uses examples to disclose certain embodiments of the present disclosure, including the best mode, and also to enable any person skilled in the art to practice certain embodiments of the present disclosure, including making and using any devices or systems and performing any incorporated methods. The patentable scope of certain embodiments of the present disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Examples

Example 1 is adevice for wireless communication, comprising: at least one antenna; a radio transceiver; and at least one circuitry to coupled to the antenna and the radio transceiver, the at least one circuitry to: assign respective subsets of subcarrier frequencies to a plurality of user devices for communication with the plurality of user devices over a wireless channel, wherein a first user device of the plurality of devices is associated with a first subset of subcarrier frequencies, and a second user device of the plurality of devices is associated with a second subset of subcarrier frequencies; transmit, simultaneously via the radio transceiver and the at least one antenna, a channel status request poll to the plurality of user devices; determine, based at least in part on a first channel status response received via the first subset of subcarrier frequencies over the wireless channel, that the first channel status response is received from the first user device; determine, based at least on part on a second channel status response received via the second subset of subcarrier frequencies over the wireless channel, that the second channel status response is received from the second user device; and determine, based at least in part on the first channel status response and the second channel status response, to schedule simultaneous data communication for the first device and the second device.

In Example 2, the subject matter of Example 1 can optionally include that the channel status request poll comprises a request poll for a clear channel assessment (CCA) response from the plurality of user devices.

In Example 3, the subject matter of Example 1 can optionally include that the first channel status response comprises a first clear channel assessment (CCA) response, and the second channel status response comprises a second CCS response.

In Example 4, the subject matter of Example 1 can optionally include that the first channel status response and the second channel status response are received simultaneously using at least one of an orthogonal frequency division multiplexing (OFDM) signal or a frequency division multiple access (FDMA) signal.

In Example 5, the subject matter of Example 1 can optionally include that the computer-executable instructions to determine to schedule simultaneous data communication further cause the at least one circuitry to: determine, based at least in part on the first channel status response via the first set of subcarrier frequencies, that the first user device perceives the wireless channel to be clear.

In Example 6, the subject matter of Example 5 can optionally include that the computer-executable instructions to determine to schedule simultaneous data communication further cause the at least one circuitry to: determine, based at least in part on the first channel status response via the first set of subcarrier frequencies, that the first user device includes a quantity of data to be transmitted; and determine that the quantity of data is greater than or equal to a quantity threshold.

In Example 7, the subject matter of Example 1 can optionally include a signal amplifier, and that the computer-executable instructions further cause the at least one circuitry to: identify, a first wireless signal preamble included in the first channel status response; and adjust, based at least in part on the first wireless signal preamble, a gain associated with the signal amplifier.

In example 8, the subject matter of Example 1 can optionally include that the computer-executable instructions further cause the at least one circuitry to: determine a signal strength associated with the first channel status response; determine that the signal strength is greater than a signal strength threshold; and determine that first user device is ready for data communication.

Example 9 is a method for wireless communication, comprising: assigning, by a device comprising one or more processors, respective subsets of subcarrier frequencies to a plurality of user devices for communication over a wireless channel, wherein a first user device of the plurality of devices is associated with a first subset of subcarrier frequencies, and a second user device of the plurality of devices is associated with a second subset of subcarrier frequencies; transmitting, simultaneously via a radio transceiver and at least one antenna included in the computer, a channel status request poll to the plurality of user devices; determining, based at least in part on a first channel status response received via the first subset of subcarrier frequencies over the wireless channel, that the first channel status response is received from the first user device; determining, based at least on part on a second channel status response received via the second subset of subcarrier frequencies over the wireless channel, that the second channel status response is received from the second user device; and determining, based at least in part on the first channel status response and the second channel status response, to schedule simultaneous data communication for the first device and the second device.

In example 10, the subject matter of Example 9 can optionally include that the channel status request poll comprises a request poll for a clear channel assessment (CCA) response from the plurality of user devices.

In Example 11, the subject matter of Example 9 can optionally include that the first channel status response comprises a first clear channel assessment (CCA) response, and the second channel status response comprises a second CCS response.

In Example 12, the subject matter of Example 9 can optionally include that the one or more channel status responses are received simultaneously via a single subcarrier of at least one of an orthogonal frequency division multiplexing (OFDM) signal or a frequency division multiple access (FDMA) signal.

In Example 13, the subject matter of Example 9 can optionally include that determining to schedule simultaneous data communication further comprises: determining, based at least in part on the first channel status response via the first set of subcarrier frequencies, that the first user device perceives the wireless channel to be clear.

In Example 14, the subject matter of Example 9 can optionally include determining to schedule simultaneous data communication further comprises: determining, based at least in part on the first channel status response via the first set of subcarrier frequencies, that the first user device includes a quantity of data to be transmitted; and determining that the quantity of data is greater than or equal to a quantity threshold In Example 15, the subject matter of Example 9 can optionally include identifying a first wireless signal preamble included in the first channel status response; and adjusting, based at least in part on the first wireless signal preamble, a gain associated with a signal amplifier included in the device.

In Example 16, the subject matter of Example 9 can optionally include determining a signal strength associated with the first channel status response; determining that the signal strength is greater than a signal strength threshold; and determining that first user device is ready for data communication.

Example 17, is a non-transitory computer-readable medium comprising instructions, that when executed by at least one processor, cause the at least one processor to: assign respective subsets of subcarrier frequencies to a plurality of user devices for communication with the plurality of user devices over a wireless channel, wherein a first user device of the plurality of devices is associated with a first subset of subcarrier frequencies, and a second user device of the plurality of devices is associated with a second subset of subcarrier frequencies; transmit, simultaneously, a channel status request poll to the plurality of user devices; determine, based at least in part on a first channel status response received via the first subset of subcarrier frequencies over the wireless channel, that the first channel status response is received from the first user device; determine, based at least on part on a second channel status response received via the second subset of subcarrier frequencies over the wireless channel, that the second channel status response is received from the second user device; and determine, based at least in part on the first channel status response and the second channel status response, to schedule simultaneous data communication for the first device and the second device.

In Example 18, the subject matter of Example 17 can optionally include that the channel status request poll comprises a request poll for a clear channel assessment (CCA) response from the plurality of user devices.

In Example 19, the subject matter of Example 17 can optionally include that the first channel status response comprises a first clear channel assessment (CCA) response, and the second channel status response comprises a second CCS response.

In Example 20, the subject matter of Example 17 can optionally include that the first channel status response and the second channel status response are received simultaneously using at least one of an orthogonal frequency division multiplexing (OFDM) signal or a frequency division multiple access (FDMA) signal.

In Example 21, the subject matter of Example 17 can optionally include that the computer-executable instructions to determine to schedule simultaneous data communication further cause the at least one processor to: determine, based at least in part on the first channel status response via the first set of subcarrier frequencies, that the first user device perceives the wireless channel to be clear.

In Example 22, the subject matter of Example 21 can optionally include that the computer-executable instructions to determine to schedule simultaneous data communication further cause the at least one processor to: determine, based at least in part on the first channel status response via the first set of subcarrier frequencies, that the first user device includes a quantity of data to be transmitted; and determine that the quantity of data is greater than or equal to a quantity threshold.

In Example 23, the subject matter of Example 17 can optionally include the computer-executable instructions further cause the at least one processor to: identify, a first wireless signal preamble included in the first channel status response; and adjust, based at least in part on the first wireless signal preamble, a gain associated with a signal amplifier.

In example 24, the subject matter of Example 17 can optionally include that the computer-executable instructions further cause the at least one processor to: determine a signal strength associated with the first channel status response; determine that the signal strength is greater than a signal strength threshold; and determine that first user device is ready for data communication.

Example 25 is an apparatus for wireless communication, including: means for assigning respective subsets of subcarrier frequencies to a plurality of user devices for communication over a wireless channel, wherein a first user device of the plurality of devices is associated with a first subset of subcarrier frequencies, and a second user device of the plurality of devices is associated with a second subset of subcarrier frequencies; means for transmitting, simultaneously, a channel status request poll to the plurality of user devices; means for determining, based at least in part on a first channel status response received via the first subset of subcarrier frequencies over the wireless channel, that the first channel status response is received from the first user device; means for determining, based at least on part on a second channel status response received via the second subset of subcarrier frequencies over the wireless channel, that the second channel status response is received from the second user device; and means for determining, based at least in part on the first channel status response and the second channel status response, to schedule simultaneous data communication for the first device and the second device.

In example 26, the subject matter of Example 25 can optionally include that the channel status request poll comprises a request poll for a clear channel assessment (CCA) response from the plurality of user devices.

In example 27, the subject matter of Example 25 can optionally include that the first channel status response comprises a first clear channel assessment (CCA) response, and the second channel status response comprises a second CCS response.

In example 28, the subject matter of Example 25 can optionally include that the first channel status response and the second channel status response are received simultaneously using at least one of an orthogonal frequency division multiplexing (OFDM) signal or a frequency division multiple access (FDMA) signal.

In example 29, the subject matter of Example 25 can optionally include that the means for determining to schedule simultaneous data communication further comprises: means for determining, based at least in part on the first channel status response via the first set of subcarrier frequencies, that the first user device perceives the wireless channel to be clear.

In example 30, the subject matter of Example 25 can optionally include that the means for determining to schedule simultaneous data communication further comprises: means for determining, based at least in part on the first channel status response via the first set of subcarrier frequencies, that the first user device includes a quantity of data to be transmitted; and means for determining that the quantity of data is greater than or equal to a quantity threshold.

In example 31, the subject matter of Example 25 can optionally include means for identifying a first wireless signal preamble included in the first channel status response; and means for adjusting, based at least in part on the first wireless signal preamble, a gain associated with a signal amplifier included in the device.

In example 32, the subject matter of Example 25 can optionally include means for determining a signal strength associated with the first channel status response; means for determining that the signal strength is greater than a signal strength threshold; and means for determining that first user device is ready for data communication.

What is claimed is:

1. An access point (AP) device for soliciting one or more channel status responses, the AP device comprising storage and processing circuitry, the processing circuitry coupled to storage, the processing circuitry configured to:
    determine, by the AP device, a plurality of user devices associated with a multiuser communication over a wireless channel, wherein the wireless channel is associated with a plurality of subcarrier frequencies;
    assign, by the AP device, a first subset of subcarrier frequencies to a first user device of the plurality of user devices, wherein the first subset is associated with a first subcarrier frequency;
    assign, by the AP device, a second subset of subcarrier frequencies to a second user device of the plurality of user devices, wherein the second subset is associated with a second subcarrier frequency;
    cause to send, by the AP device, a channel status request poll to the plurality of user devices, wherein the channel status request poll comprises a first indication of a first time period for the plurality of user devices to simultaneously transmit their respective channel status response uplink to the AP device, a second indication of the first subcarrier frequency for the first user device to transmit a first channel status response, and a third indication of the second subcarrier frequency for the second user device to transmit a second channel status response;
    identify, by the AP device, the first channel status response received from the first user device over the first subset of subcarrier frequencies during the first time period;
    determine, by the AP device, based on the first channel status response received from the first user device by the AP device, that a quantity of data that the first user device is to transmit uplink to the AP device after the first user device has transmitted the first channel status response to the AP device is greater than a data threshold;
    determine, by the AP device, based on a first signal strength being greater than a threshold signal strength greater than zero and based on the quantity of data being greater than the data threshold, that the first user device is ready for data communication, wherein the first signal strength is associated with the first channel status response and the first subcarrier frequency;
    identify, by the AP device, the second channel status response received from the second user device over the second subset of subcarrier frequencies during the first time period; and
    determine, by the AP device, based on a second signal strength being greater than the threshold signal strength, that the second user device is ready for data communication, wherein the second signal strength is associated with the second channel status response and the second subcarrier frequency.

2. The AP device of claim 1, wherein the processing circuitry is further configured to determine that the second user device is not ready for data communication based on an absence of a third channel status response from the second user device during a second time period.

3. The AP device of claim 1, wherein the processing circuitry is further configured to assign a third subset of subcarrier frequencies to a third user device of plurality of user devices.

4. The AP device of claim 3, wherein the processing circuitry is further configured to identify a third channel status response received from the third user device over the third subset of subcarrier frequencies.

5. The AP device of claim 4, wherein the third channel status response is simultaneously received during the first time period.

6. The AP device of claim 1, wherein the channel status request poll is sent simultaneously to the plurality of user devices.

7. The AP device of claim 1, wherein the processing circuitry is further configured to determine, based on the first channel status response, a feedback indication that the first user device has the quantity of data to be transmitted.

8. The AP device of claim 1, wherein the processing circuitry is further configured to determine, based on the first channel status response that the first user device identifies the wireless channel to be clear.

9. The AP device of claim 1, further comprising a transceiver configured to transmit and receive wireless signals.

10. The AP device of claim 9, further comprising an antenna coupled to the transceiver.

11. A non-transitory computer-readable medium storing computer-executable instructions which when executed by one or more processors of an access point (AP) device result in performing operations comprising:
    determining, by the AP device, a plurality of user devices associated with a multiuser communication over a wireless channel, wherein the wireless channel is associated with a plurality of subcarrier frequencies;
    assigning, by the AP device, a first subset of subcarrier frequencies to a first user device of the plurality of user devices, wherein the first subset is associated with a first subcarrier frequency;
    assigning, by the AP device, a second subset of subcarrier frequencies to a second user device of the plurality of user devices, wherein the second subset is associated with a second subcarrier frequency;
    causing to send, by the AP device, a channel status request poll to the plurality of user devices, wherein the channel status request poll comprises a first indication of a first time period for the plurality of user devices to simultaneously transmit their respective channel status response uplink to the AP device, a second indication of the first subcarrier frequency for the first user device to transmit a first channel status response, and a third indication of the second subcarrier frequency for the second user device to transmit a second channel status response;
    identifying, by the AP device, the first channel status response received from the first user device over the first subset of subcarrier frequencies during the first time period;

determining, by the AP device, based on the first channel status response received from the first user device by the AP device, that a quantity of data that the first user device is to transmit uplink to the AP device after the first user device has transmitted the first channel status response to the AP device is greater than a data threshold;

determining, by the AP device, based on a first signal strength being greater than a threshold signal strength greater than zero and based on the quantity of data being greater than the data threshold, that the first user device is ready for data communication, wherein the first signal strength is associated with the first channel status response and the first subcarrier frequency;

identifying, by the AP device, the second channel status response received from the second user device over the second subset of subcarrier frequencies during the first time period; and determining, by the AP device, based on a second signal strength being greater than the threshold signal strength, that the second user device is ready for data communication, wherein the second signal strength is associated with the second channel status response and the second subcarrier frequency.

12. The non-transitory computer-readable medium of claim 11, wherein the operations further comprise determining that the second user device is not ready for data communication based on an absence of a third channel status response from the second user device during a second time period.

13. The non-transitory computer-readable medium of claim 11, wherein the operations further comprise assigning a third subset of subcarrier frequencies to a third user device of plurality of user devices.

14. The non-transitory computer-readable medium of claim 13, wherein the operations further comprise identifying a third channel status response received from the third user device over the third subset of subcarrier frequencies.

15. The non-transitory computer-readable medium of claim 14, wherein the third channel status response is simultaneously received during the first time period.

16. A method comprising:
determining, by processing circuitry of an access point (AP) device, a plurality of user devices associated with a multiuser communication over a wireless channel, wherein the wireless channel is associated with a plurality of subcarrier frequencies;

assigning, by the processing circuitry of the AP device, a first subset of subcarrier frequencies to a first user device of the plurality of user devices, wherein the first subset is associated with a first subcarrier frequency;

assigning, by the processing circuitry of the AP device, a second subset of subcarrier frequencies to a second user device of the plurality of user devices, wherein the second subset is associated with a second subcarrier frequency;

causing to send, by the processing circuitry of the AP device, a channel status request poll to the plurality of user devices, wherein the channel status request poll comprises a first indication of a first time period for the plurality of user devices to simultaneously transmit their respective channel status response uplink to the AP device, a second indication of the first subcarrier frequency for the first user device to transmit a first channel status response, and a third indication of the second subcarrier frequency for the second user device to transmit a second channel status response;

identifying, by the processing circuitry of the AP device, the first channel status response received from the first user device over the first subset of subcarrier frequencies during the first time period;

determining, by the processing circuitry of the AP device, based on the first channel status response received from the first user device by the AP device, that a quantity of data that the first user device is to transmit uplink to the AP device after the first user device has transmitted the first channel status response to the AP device is greater than a data threshold;

determining, by the processing circuitry of the AP device, based on a first signal strength being greater than a threshold signal strength greater than zero and based on the quantity of data being greater than the data threshold, that the first user device is ready for data communication, wherein the first signal strength is associated with the first channel status response and the first subcarrier frequency;

identifying, by the processing circuitry of the AP device, the second channel status response received from the second user device over the second subset of subcarrier frequencies during the first time period; and determining, by the processing circuitry of the AP device, based on a second signal strength being greater than the threshold signal strength, that the second user device is ready for data communication, wherein the second signal strength is associated with the second channel status response and the second subcarrier frequency.

17. The method of claim 16, further comprising determining that the second user device is not ready for data communication based on an absence of a third channel status response from the second user device during a second time period.

18. The method of claim 16, further comprising assigning a third subset of subcarrier frequencies to a third user device of plurality of user devices.

19. The method of claim 18, further comprising identifying a third channel status response received from the third user device over the third subset of subcarrier frequencies.

20. The method of claim 19, wherein the third channel status response is simultaneously received during the first time period.

* * * * *